US010372571B2

(12) United States Patent
Cao et al.

(10) Patent No.: US 10,372,571 B2
(45) Date of Patent: Aug. 6, 2019

(54) METHOD AND APPARATUS FOR TESTING COMPATIBILITY OF 3D ENGINE

(71) Applicant: TENCENT TECHNOLOGY (SHENZHEN) COMPANY LIMITED, Shenzhen (CN)

(72) Inventors: Wensheng Cao, Shenzhen (CN); Yanqing Jing, Shenzhen (CN); Jun Li, Shenzhen (CN); Kang Du, Shenzhen (CN); Tianping Geng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 179 days.

(21) Appl. No.: 15/117,029

(22) PCT Filed: Feb. 11, 2015

(86) PCT No.: PCT/CN2015/072786
§ 371 (c)(1),
(2) Date: Aug. 5, 2016

(87) PCT Pub. No.: WO2015/120797
PCT Pub. Date: Aug. 20, 2015

(65) Prior Publication Data
US 2017/0091058 A1 Mar. 30, 2017

(30) Foreign Application Priority Data
Feb. 11, 2014 (CN) .......................... 2014 1 0048079

(51) Int. Cl.
G06F 11/22 (2006.01)
G06F 11/26 (2006.01)

(52) U.S. Cl.
CPC ........ *G06F 11/2236* (2013.01); *G06F 11/261* (2013.01)

(58) Field of Classification Search
CPC ....... G06T 1/20; G06T 15/005; G06F 17/212; G06F 21/32; G06F 21/35; G06F 3/0346;
(Continued)

(56) References Cited

U.S. PATENT DOCUMENTS 8,301,415 B2 * 10/2012 Liu ...................... G06T 15/005
702/186
8,732,729 B2 * 5/2014 Quarre ...................... G06F 9/54
719/323
(Continued)

FOREIGN PATENT DOCUMENTS

| CN | 102053890 A | 5/2011 |
| CN | 102436363 A | 5/2012 |

OTHER PUBLICATIONS

International Search Report in international application No. PCT/CN2015/072786, dated May 18, 2015.
(Continued)

*Primary Examiner* — John H Le
(74) *Attorney, Agent, or Firm* — Anova Law Group, PLLC (57) ABSTRACT

The present disclosure discloses a method and an apparatus for testing the compatibility of a 3D engine. The method includes: acquiring a hardware capability parameter of a graphics card to be simulated, the hardware capability parameter recording a capability supported by the graphics card; running a predetermined 3D engine according to the hardware capability parameter; and determining, according to a result of running the 3D engine, whether the 3D engine is compatible with the graphics card to be simulated. The present disclosure solves the technical problem that a hardware testing environment needs to be repeatedly built to test the compatibility of the 3D engine on different graphics cards, thereby achieving technical effects of simulating
(Continued)

different virtual graphics cards to implement testing in a hardware testing environment built once, and shortening a testing period.

15 Claims, 6 Drawing Sheets

(58) Field of Classification Search
CPC ............... G06F 11/2236; G06F 13/409; Y10S 345/904; G06K 19/07701; G06K 7/087; G06K 9/00892; G06K 9/00906; G06Q 20/1085; G06Q 20/34; G06Q 20/341; H04L 63/0861
USPC .......... 702/82, 121, 186; 345/443, 543, 503; 719/323
See application file for complete search history.

(56) References Cited

U.S. PATENT DOCUMENTS

| | | |
|---|---|---|
| 2002/0101439 A1 | 8/2002 | Mamona |
| 2008/0043032 A1 | 2/2008 | Mamona |
| 2011/0098978 A1 | 4/2011 | Liu |
| 2012/0229446 A1 | 9/2012 | Hyndman |

OTHER PUBLICATIONS

English Translation of the Written Opinion of the International Search Authority in international application No. PCT/CN2015/072786, dated May 18, 2015.
Notification of the First Office Action of Chinese application No. 201410048079.5, dated Apr. 22, 2016.
"Game compatibility test artifact a virtual card", Daisy, "yue headline read > recommended", HttQ: / / DJT. QQ. Com/article/view / 1010, 1 on p. 6 , mailed on Dec. 25, 2013.

* cited by examiner

METHOD AND APPARATUS FOR TESTING COMPATIBILITY OF 3D ENGINE

FIELD OF THE TECHNOLOGY

The present disclosure relates to the field of computers, and in particular, to a method and an apparatus for testing the compatibility of a 3D engine.

BACKGROUND OF THE DISCLOSURE

Figure 1:
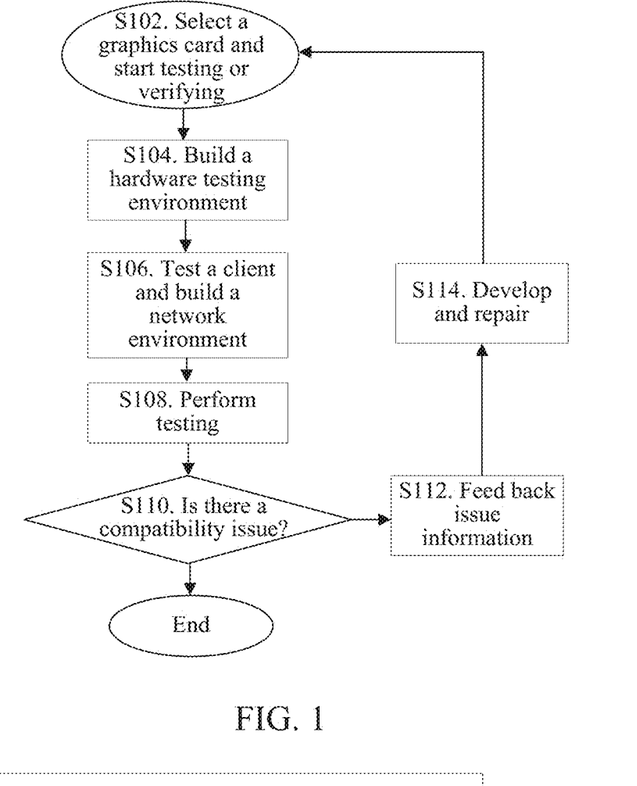
FIG. 1 is a flowchart of a method for testing the compatibility of a 3D engine in the prior art.

Currently, in a conventional solution of testing the compatibility of a 3D engine, for example, in step S102 to step S114 shown in FIG. 1, generally, different graphics cards are selected to perform hardware testing, to determine whether a graphics card to be tested is compatible with a 3D engine. In such a testing method, different models of graphics cards need to be searched for, and a large number of hardware testing environments need to be built for testing; and then information about a tested problem is fed back for development and repair. However, such a solution of testing the compatibility of a 3D engine has many defects:

1. There are some difficulties for building a hardware environment because some graphics cards are difficult to be found, and a large amount of hardware leads to high costs; as a result, the building of a large number of hardware testing environments is difficult to implement.

2. A testing period is relatively long. A client with memory of several GBs needs a relatively long time when copying, inserting and removing a graphics card, reinstalling a driver, and configuring a network environment, which is also inappropriate to a quick procedure.

3. Generally, information fed back by a compatibility test usually only describes a phenomenon (such as a screenshot or a testing environment), helps little in locating a reason, and is also inconvenient for building a testing environment in the terms of development, finally leading to some long-time insolvable compatibility issues.

For the foregoing problems, no effective solution is provided yet currently.

SUMMARY

Embodiments of the present invention provide a method and an apparatus for testing the compatibility of a 3D engine, so as to at least solve the technical problem that a hardware testing environment needs to be repeatedly built to test the compatibility of a 3D engine with different graphics cards.

According to an aspect of the embodiments of the present invention, a method for testing the compatibility of a 3D engine is provided, including: acquiring a hardware capability parameter of a graphics card to be simulated, the hardware capability parameter recording a capability supported by the graphics card; running a predetermined 3D engine according to the hardware capability parameter; and determining, according to a result of running the 3D engine, whether the 3D engine is compatible with the graphics card to be simulated.

Optionally, the running a predetermined 3D engine according to the hardware capability parameter includes: determining whether a capability implemented by an application programming interface (API) that is invoked when the 3D engine is run is the capability that is supported by the graphics card and recorded by the hardware capability parameter; and determining, if the capability implemented by the API is the capability that is supported by the graphics card and recorded by the hardware capability parameter, that the result of running the 3D engine is normal; or determining, if the capability implemented by the API is not the capability that is supported by the graphics card and recorded by the hardware capability parameter, that the result of running the 3D engine is error.

Optionally, the determining, according to a result of running the 3D engine, whether the 3D engine is compatible with the graphics card to be simulated includes: determining, if the result of running the 3D engine is normal, that the 3D engine is compatible with the graphics card to be simulated; or determining, if the result of running the 3D engine is error, that the 3D engine is incompatible with the graphics card to be simulated.

Optionally, the determining whether a capability implemented by an API that is invoked when the 3D engine is run is the capability that is supported by the graphics card and recorded by the hardware capability parameter includes: returning, by using a preset API, when the 3D engine is run, if it is determined that the API needs to be invoked currently, the capability implemented by the invoked API; and determining whether the returned capability is the capability that is supported by the graphics card and recorded by the hardware capability parameter.

Optionally, after the determining, according to a result of running the 3D engine, whether the 3D engine is compatible with the graphics card to be simulated, the method further includes: outputting information for identifying the API and information about the capability if the result of running the 3D engine is error.

Optionally, before the acquiring a hardware capability parameter of a graphics card to be simulated, the method further includes: establishing a graphics card information database, where the graphics card information database records models and hardware capability parameters of multiple graphics cards including the graphics card to be simulated, where the acquiring a hardware capability parameter of a graphics card to be simulated includes: acquiring the hardware capability parameter of the graphics card to be simulated from the graphics card information database.

According to another aspect of the embodiments of the present invention, an apparatus for testing the compatibility of a 3D engine is provided, including: an acquiring unit, configured to acquire a hardware capability parameter of a graphics card to be simulated, the hardware capability parameter recording a capability supported by the graphics card; a running unit, configured to run a predetermined 3D engine according to the hardware capability parameter; and a determining unit, configured to determine, according to a result of running the 3D engine, whether the 3D engine is compatible with the graphics card to be simulated.

Optionally, the finning unit includes: a first determining module, configured to determine whether a capability implemented by an API that is invoked when the 3D engine is run is the capability that is supported by the graphics card and recorded by the hardware capability parameter; and determine, if the capability implemented by the API is the capability that is supported by the graphics card and recorded by the hardware capability parameter, that the result of running the 3D engine is normal; or determine, if the capability implemented by the API is not the capability that is supported by the graphics card and recorded by the hardware capability parameter, that the result of running the 3D engine is error.

Optionally, the determining unit includes: a second determining module, configured to determine whether the result of running the 3D engine is normal; and determine, if the result of running the 3D engine is normal, that the 3D engine is compatible with the graphics card to be simulated; or determine, if the result of running the 3D engine is error, that the 3D engine is incompatible with the graphics card to be simulated.

Optionally, the first determining module includes: a returning submodule, configured to return, by using a preset API, when the 3D engine is run, if it is determined that the API needs to be invoked currently, the capability implemented by the invoked API; and a first determining submodule, configured to determine whether the returned capability is the capability that is supported by the graphics card and recorded by the hardware capability parameter.

Optionally, the apparatus further includes: an output unit, configured to: after it is determined, according to the result of naming the 3D engine, whether the 3D engine is compatible with the graphics card to be simulated, output information for identifying the API and information about the capability if the result of running the 3D engine is error.

Optionally, the apparatus further includes: an establishing unit, configured to establish a graphics card information database before the hardware capability parameter of the graphics card to be simulated is acquired, where the graphics card information database records models and hardware capability parameters of multiple graphics cards including the graphics card to be simulated, where the acquiring unit includes: an acquiring module, configured to acquire the hardware capability parameter of the graphics card to be simulated from the graphics card information database.

In the embodiments of the present invention, a virtual graphics card is simulated according to hardware capability parameters of different graphics cards, and a predetermined 3D engine is run on the virtual graphics card, so that the objective of testing the compatibility of 3D engines of different graphics cards is achieved, testing the compatibility by searching for a large amount of hardware and building a large number of hardware testing environments as in the prior art is avoided, and the technical problem that a hardware testing environment needs to be repeatedly built to test the compatibility of a 3D engine with different graphics cards is solved, thereby achieving technical effects of testing the compatibility of the 3D engine with different graphics cards in a hardware testing environment built once, and shortening a testing period of the compatibility.

BRIEF DESCRIPTION OF THE DRAWINGS

The accompanying drawings described herein are used to further understand the present disclosure, and constitute a part of this application, and the exemplary embodiments of the present invention and the descriptions thereof are used to explain the present disclosure, but are not construed as an inappropriate limitation to the present disclosure. In the accompanying drawings:

FIG. 6 is a schematic diagram of an optional output result of testing the compatibility of a 3D engine according to an embodiment of the present invention;

FIG. 7 is a schematic diagram of a graphics card information database established in an optional test of the compatibility of a 3D engine according to an embodiment of the present invention;

DESCRIPTION OF EMBODIMENTS

To make a person skilled in the art better understand the solutions of the present disclosure, the following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by a person of ordinary skill in the art based on the embodiments of the present invention without creative efforts shall fall within the protection scope of the present disclosure.

It should be noted that, terms such as "first" and "second" in the specification, claims and the foregoing accompanying drawings of the present disclosure are used to distinguish similar objects, but are not necessarily used to describe a specific sequence or order. It should be understood that data used in this way is interchangeable in an appropriate situation, so that the embodiments of the present invention described herein can be implemented in other sequences than those that are shown or described herein. In addition, terms "include" and "have" and any variations of them are intended to cover nonexclusive inclusions, for example, a process, method, system, product or device including a series of steps or units is not necessarily limited to those steps and units that are clearly listed, but can include other steps or units that are not clearly listed or that are inherent in the process, method, product or device.

Embodiment 1

According to this embodiment of the present invention, a method for testing the compatibility of a 3D engine is provided. Optionally, in this embodiment, a 3D engine functions as a bottom-layer tool to support development of higher-layer graphics software, and 3D engines are classified into real-time 3D engines and off-line 3D engines according to whether a result can be computed in real time by a mainstream computer. Real-time 3D pictures on a personal computer (PC) and a game machine are generated through computation by a 3D engine, and 3D pictures applied to a movie are realized by using an off-line 3D engine, so as to achieve a realistic effect. The 3D engine includes, but not limited to, at least one of the following functions: data management, a renderer, and interaction. For example, a game that is offered as a real-time game may use a rasterized rendering algorithm, and for such a design, parameters related to geometry-level data include, but not limited to, refractive index, change rate in texture coordinate space, and change rate in tangent space. The foregoing example is merely exemplary, which is not limited in this application.

Figure 2:
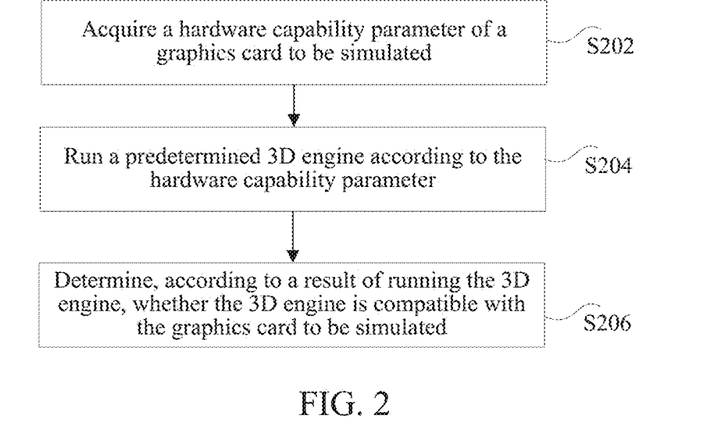
FIG. 2 is a flowchart of an optional method for testing the compatibility of a 3D engine according to an embodiment of the present invention.

As shown in FIG. 2, the method for testing the compatibility of a 3D engine in this embodiment includes:

S202: Acquire a hardware capability parameter of a graphics card to be simulated.

Optionally, in this embodiment, the hardware capability parameter records a capability supported by the graphics card, where the capability supported by the graphics card may include, but not limited to, a cube texture (D3DTEXTURECAPS_CUBEMAP) capability, and a projected density profile (D3DTEXTURE-CAPS_PROJECTED) capability.

Optionally, in this embodiment, the hardware capability parameter of the graphics card to be simulated may be, but not limited to, stored in the form of a Caps database. The Caps database of graphics cards includes, but not limited to, models of the graphics cards, attributes of the graphics cards, values of the attributes of the graphics cards, and whether the graphics cards support a certain capability, where attributes of a graphics card in this embodiment includes, but not limited to, at least one of the following: a core frequency, a texture fill rate, a pixel fill rate, a shader, a video memory frequency, and a video memory width.

For example, using a graphics card A to be simulated as an example, as shown in FIG. 7, attributes of a graphics card whose model is ATI Radeon HD 3800 Series in the Caps database of graphics cards, and values of these attributes include: a maximum texture width (MaxTextureWidth) being 8192, and a maximum texture height (MaxTextureHeight) being 8192. In addition, it can be further known from the Caps database of graphics cards that the graphics card of this model can support the cube texture (D3DTEXTURECAPS_CUBEMAP) capability, and can also support the projected density profile (D3DTEXTURECAPS_PROJECTED) capability, but the graphics card of this model does not support an α palette (D3DTEXTURECAPS_ALPHAPALETTE) capability.

Figure 3:
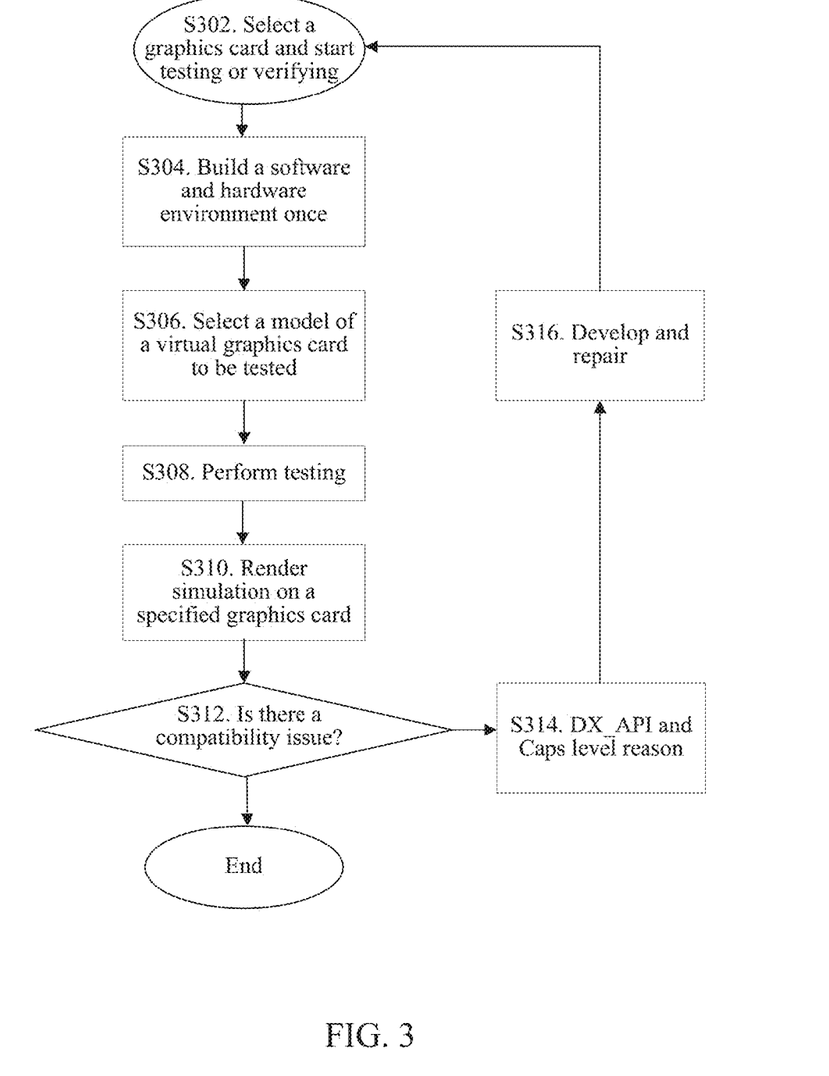
FIG. 3 is a flowchart of another optional method for testing the compatibility of a 3D engine according to an embodiment of the present invention.

For example, with reference to step S302 to step S308 shown in FIG. 3, using the graphics card A to be simulated as an example, hardware capability parameters of the graphics card A to be simulated, for example, a core frequency of f, a video memory width of B, supporting a capability X, and not supporting a capability Y, are acquired, and then testing is performed.

S204: Run a predetermined 3D engine according to the hardware capability parameter.

Optionally, in this embodiment, the 3D engine implements the required capability by invoking an API. For example, when the predetermined 3D engine is run, the 3D engine invokes APIs: API_1, API_2, and API_3, to implement a capability M, a capability N, and a capability P corresponding to the APIs.

S206: Determine, according to a result of running the 3D engine, whether the 3D engine is compatible with the graphics card to be simulated.

Optionally, in this embodiment, after it is determined whether the 3D engine is compatible with the graphics card to be simulated, the root cause of a compatibility issue may be further located, for example, information for indicating incompatibility may include, but not limited to, an API and a capability in the Caps database. For example, with reference to step S310 to step S316 shown in FIG. 3, after a test result indicating incompatibility is determined, information for indicating incompatibility is output: incompatible with API_2, and/or, incompatible with the capability N in the Caps database; and then, the information for indicating incompatibility is fed back, making it convenient for a developer to quickly fix the problem.

For example, using the graphics card A to be simulated as an example, the capability parameter corresponding to the capability that needs to be implemented by the API invoked by the 3D engine is learned according to the test result of running the 3D engine, and the capability parameter is compared with the hardware capability parameter of the graphics card A to be simulated, to determine whether the 3D engine is compatible with the graphics card A to be simulated.

In this embodiment provided by this application, different virtual graphics card data is simulated, and the data is used to test the compatibility of a 3D engine, to determine whether the 3D engine is compatible with a graphics card to be simulated, so that the problems of a long testing period and low efficiency caused by insertion and removal of a graphics card, driver reinstallation, and repeated building of a large number of hardware testing environments in the prior art are avoided, and different models of graphics cards are tested in the case of building a testing environment once, thereby shortening the testing period, and accelerating a testing procedure.

Figure 4:
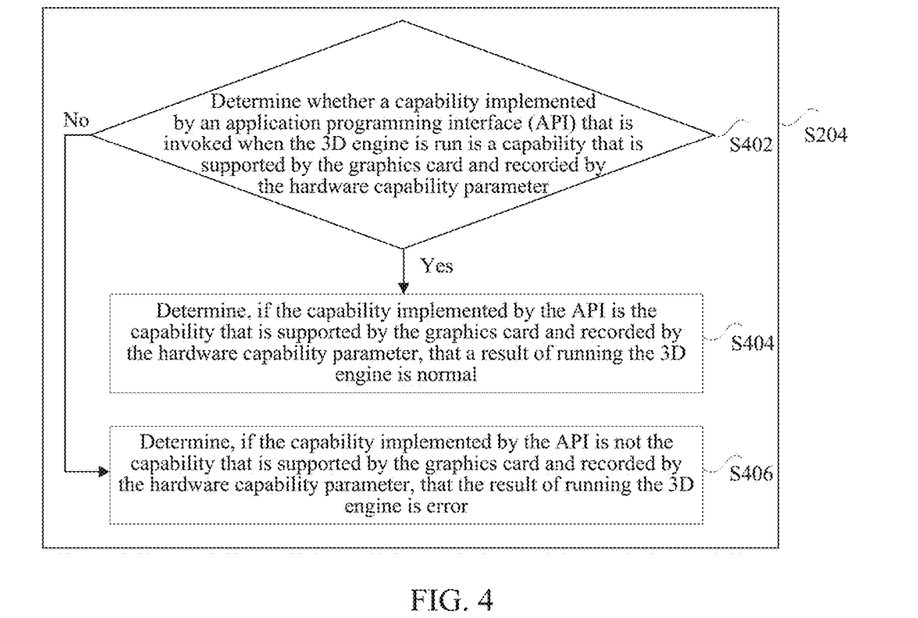
FIG. 4 is a flowchart of still another optional method for testing the compatibility of a 3D engine according to an embodiment of the present invention.

As an optional solution, as shown in FIG. 4, step S204 of running a predetermined 3D engine according to the hardware capability parameter includes:

S402: Determine whether a capability implemented by an API that is invoked when the 3D engine is run is the capability that is supported by the graphics card and recorded by the hardware capability parameter.

For example, using the graphics card A to be simulated as an example, the 3D engine invokes APIs: API_1, API_2, and API_3, to implement the capability M, the capability N, and the capability P, to determine whether the capability that needs to be implemented by the 3D engine is the capability supported by the graphics card and recorded by the hardware capability parameter.

S404: Determine, if the capability implemented by the API is the capability that is supported by the graphics card and recorded by the hardware capability parameter, that the result of running the 3D engine is normal.

For example, using the graphics card A to be simulated as an example, the 3D engine invokes APIs: API_1, API_2, and API_3, to implement the capability M (for example, the maximum texture width (MaxTextureWidth) is 8192), the capability N (the projected density profile (D3DTEXTURECAPS_PROJECTED) capability), and the capability P (for example, the cube texture (D3DTEXTURECAPS_CUBEMAP) capability). It can be known from the Caps database of graphics cards that the graphics card A to be simulated can support the foregoing capabilities, and it is determined that the result of running the 3D engine is normal.

S406: Determine, if the capability implemented by the API is not the capability that is supported by the graphics card and recorded by the hardware capability parameter, that the result of running the 3D engine is error.

For example, using the graphics card A to be simulated as an example, the 3D engine invokes APIs: API_1, API_2, and API_3, to implement the capability M (for example, the maximum texture width (MaxTextureWidth) is 8192), the capability N (the projected density profile (D3DTEXTURECAPS_PROJECTED) capability), and the capability P (for example, the α palette (D3DTEXTURECAPS_ALPHAPALETTE) capability). It can be known from the Caps database of graphics cards that the graphics card A to be simulated can support the capability M and the capability N, but does not support the capability P, and it is determined that the result of running the 3D engine is error.

In this embodiment provided by this application, it is determined whether a capability implemented by an API invoked by a 3D engine is a capability supported by a graphics card to be simulated, to obtain whether a result of running the 3D engine is normal, thereby obtaining a result of testing the compatibility of the 3D engine, so that a tester can obtain, by only simulating different models of graphics cards in a physical configuration environment and comparing capabilities, the result of testing the compatibility of the 3D engine, thereby saving a lot of time in building an environment, and shortening a testing period.

As an optional solution, step S206 of determining, according to the result of running the 3D engine, whether the 3D engine is compatible with the graphics card to be simulated includes:

S1: Determine, if the result of running the 3D engine is normal, that the 3D engine is compatible with the graphics card to be simulated.

S2: Determine, if the result of running the 3D engine is error, that the 3D engine is incompatible with the graphics card to be simulated.

For example, using the graphics card A to be simulated as an example, if it can be known from the Caps database of graphics cards that, the graphics card A to be simulated can support the corresponding capability M, capability N, and capability P when the 3D engine invokes the APIs, it is determined that the result of running the 3D engine is normal, and further, a test result indicating that the 3D engine is compatible with the graphics card A to be simulated may be obtained; however, if it is determined that the result of running the 3D engine is error, a test result indicating, that the 3D engine is incompatible with the graphics card A to be simulated is obtained.

Figure 5:
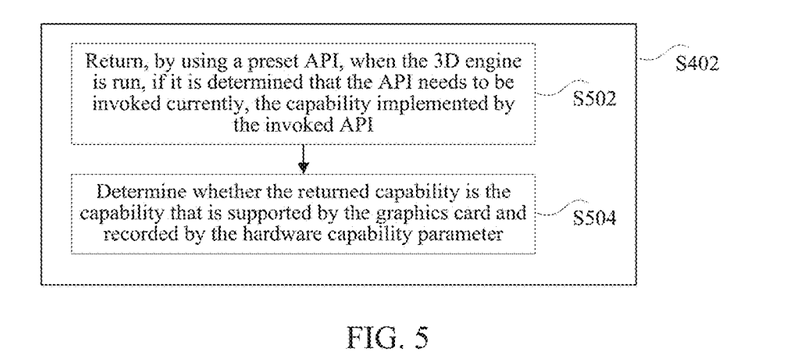
FIG. 5 is a flowchart of yet another optional method for testing the compatibility of a 3D engine according to an embodiment of the present invention.

As still another optional solution, as shown in FIG. 5, step S402 of determining whether a capability implemented by an API that is invoked when the 3D engine is run is the capability that is supported by the graphics card and recorded by the hardware capability parameter includes:

S502: Return, by using a preset API, when the 3D engine is run, if it is determined that the API needs to be invoked currently, the capability implemented by the invoked API.

Optionally, in this embodiment, in an algorithm corresponding to the 3D engine, a function corresponding to the foregoing API for returning the implemented capability may be preset before or in the function corresponding to the foregoing preset API that needs to be invoked, so that before the function corresponding to the foregoing API that needs to be invoked is invoked, the foregoing preset function corresponding to the API is invoked first to return the capability implemented by the invoked API. For example, using the graphics card A to be simulated as an example, the 3D engine currently needs to invoke APIs: API_1, API_2, and API_3, to implement the capability M (for example, the maximum texture width (MaxTextureWidth) is 8192), the capability N (the projected density profile (D3DTEXTURECAPS_PROJECTED) capability), and the capability P (for example, the α palette (D3DTEXTURECAPS_ALPHAPALETTE) capability), and information about the capability M, the capability N, and the capability P implemented by the APIs currently invoked by the 3D engine may be returned by the using the preset API.

It is further noted that, under the premise of making no modification to the tested 3D engine, the API invoked when the 3D engine is run is remolded by using the preset API, the capability implemented by the API invoked by the 3D engine is learned, and the foregoing capability is returned.

S504: Determine whether the returned capability is the capability that is supported by the graphics card and recorded by the hardware capability parameter.

For example, using the graphics card A to be simulated as an example, capabilities that correspond to the APIs currently invoked by the 3D engine and are returned by using the preset API are the capability M (for example, the maximum texture width (MaxTextureWidth) is 8192), the capability N (the projected density profile (D3DTEXTURECAPS_PROJECTED) capability), and the capability P (for example, the α palette (D3DTEXTURECAPS_ALPHAPALETTE) capability), and it is determined whether the foregoing capabilities are capabilities supported by the graphics card A to be simulated recorded by the hardware capability parameter.

In this embodiment provided by this application, from the perspective of a third party, a capability implemented by an API that currently needs to be invoked when a 3D engine is run is learned by using a preset API, and is further compared with a capability that is supported by a graphics card and recorded by a hardware capability parameter, and whether the 3D engine is compatible with the graphics card to be simulated is obtained, thereby acquiring invoking information completely from the third party when the 3D engine is run, and automatically testing the compatibility of the graphics card with the 3D engine.

As an optional solution, after step S206 of determining, according to the result of running the 3D engine, whether the 3D engine is compatible with the graphics card to be simulated, the method further includes:

S1: Output information for identifying the API and information about the capability if the result of running the 3D engine is error.

Optionally, in this embodiment, after it is determined whether the 3D engine is compatible with the graphics card to be simulated, the root cause of a compatibility issue may be further located and output, for example, information for indicating incompatibility may include, but not limited to, an API and a capability in the Caps database.

Optionally, as shown in FIG. 6, Bench3D is a tool for testing the capability and the compatibility of the 3D engine in this embodiment, where a test result output by the Bench3D includes: a DXDebug view, and information about an identified API and information about a capability in the Caps database when the result of running the 3D engine is error can be known from the view. For example, the foregoing information may include: a sequence number (for example, 23850), a time (for example, 20:11:45:577), and Debuginfo (for example, Direct3D9: Texture in a virtual device D3DFMT_R16F format does not support D3DUSAGE_QUERY_POSTPIXELSHADER_BLENDING), foregoing example is merely exemplary, which is not limited in this application.

For example, using the graphics card A to be simulated as an example, if it can be known from the Caps database of graphics cards that the graphics card A to be simulated does not support the corresponding capability M when the 3D engine invokes the API, it is determined that the result of running the 3D engine is error, and further the information about the identified API and the information about the capability in the Caps database are output. For example, the output information may include the following information: a sequence number is 23850, a time is 20:11:45:577, and Debuginfo is Direct3D9: Texture in a virtual device D3DFMT_R16F format does not support D3DUSAGE_QUERY_POSTPIXELSHADER_BLENDING.

In this embodiment provided by this application, when a result of running a 3D engine is error, information for identifying an API and information about a capability are output, thereby solving the problem in the prior art that a test result only feeds back the description for a phenomenon, accurately locating the root cause of a compatibility issue, and making it convenient for a developer to quickly fix the problem.

Figure 8:
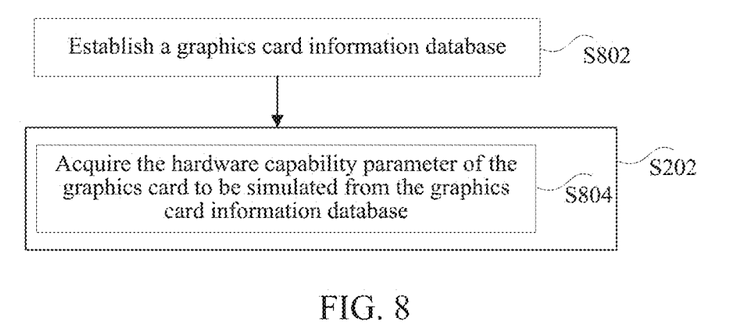
FIG. 8 is a flowchart of an optional method for testing the compatibility of a 3D engine according to an embodiment of the present invention.

As an optional solution, as shown in FIG. 8, before the acquiring a hardware capability parameter of a graphics card to be simulated, the method further includes:

S802: Establish a graphics card information database.

Optionally, in this embodiment, the graphics card information database records models and hardware capability parameters of multiple graphics cards including the graphics card to be simulated.

For example, before the hardware capability parameter of the graphics card to be simulated is acquired, a large amount of graphics card information is collected, and a relatively complete graphics card information database (the Caps database of graphics cards) is established. As shown in FIG. 7, different models of graphics cards are included, for example, ATI Radeon HD 3800 Series, NVDIA GEForce 9500 GT, and RADEON X700 SE; different graphics card attributes and values corresponding to the attributes are included, for example, a graphics card A to be simulated whose model is ATI Radeon HD 3800 Series is used as an example, and the graphics card A to be simulated includes the following information: a value of a maximum texture width (MaxTextureWidth) is 8192, and a value of a maximum texture height (MaxTextureHeight) is 8192; and in addition, whether the graphics card of this model supports some capabilities is further included, for example, the graphics card A to be simulated whose model is ATI Radeon HD 3800 Series is still used as an example, and the graphics card A to be simulated can support the cube texture (D3DTEXTURECAPS_CUBEMAP) capability, and can also support the projected density profile (D3DTEXTURECAPS_PROJECTED) capability, but the graphics card of this model does not support the α palette (D3DTEXTURECAPS_ALPHAPALETTE) capability.

The acquiring a hardware capability parameter of a graphics card to be simulated in step S202 includes: S804: Acquire the hardware capability parameter of the graphics card to be simulated from the graphics card information database.

Optionally, in this embodiment, the hardware capability parameter records the capability supported by the graphics card, where the capability supported by the graphics card may include, but not limited to, the cube texture (D3DTEXTURECAPS_CUBEMAP) capability, and the projected density profile (D3DTEXTURECAPS_PROJECTED) capability.

For example, using the graphics card A to be simulated as an example, a hardware capability parameter of the graphics card A to be simulated is acquired from the graphics card information database (the Caps database of graphics cards), for example, the maximum texture width (MaxTextureWidth) is 8192, and the maximum texture height (MaxTextureHeight) is 8192. In addition, it can be further known from the Caps database of graphics cards that, the graphics card can support the cube texture (D3DTEXTURECAPS_CUBEMAP) capability, and can also support the projected density profile (D3DTEXTURECAPS_PROJECTED) capability, but the graphics card does not support the α palette (D3DTEXTURECAPS_ALPHAPALETTE) capability.

In this embodiment provided by this application, a graphics card information database is established, and a hardware capability parameter of a graphics card to be simulated is acquired from the established graphics card information database, to implement simulation of a virtual graphics card, and further complete testing of a 3D engine without repeatedly building a large number of hardware testing environments, thereby saving a lot of testing costs, and shortening a testing period.

It should be noted that, for the foregoing method embodiments, for the brevity of description, the method embodiments are described as a series of action combinations. But a person skilled in the art should appreciate that the present disclosure is not limited to the order of the described actions, because according to the present disclosure, some steps may be performed in another order or performed simultaneously. A person skilled in the art should also know that the embodiments described in this specification all belong to preferred embodiments, and the involved actions and modules are not necessarily required by the present disclosure.

Through the description of the foregoing implementation manners, a person skilled in the art may clearly understand that the method of the foregoing embodiment may be implemented in a manner of software plus a necessary general hardware platform, and certainly may also be implemented by hardware, but in most cases, the former is a better implementation manner. Based on such an understanding, the technical solutions of the present disclosure essentially, or the part contributing to the prior art may be implemented in a form of a software product. The computer software product is stored in a storage medium (such as a read-only memory (ROM)/a random access memory (RAM), a magnetic disk, or an optical disc) and includes several instructions for instructing a terminal device (which may be a mobile phone, a computer, a server, a network device, or the like) to perform the methods described in the embodiments of the present invention.

Embodiment 2

According to this embodiment of the present invention, an apparatus for testing the compatibility of a 3D engine is further provided. Optionally, in this embodiment, a 3D engine functions as a bottom-layer tool to support development of higher-layer graphics software, and 3D engines are classified into real-time 3D engines and off-line 3D engines according to whether a result can be computed in real time by a mainstream computer. Real-time 3D pictures on a PC and a game machine are generated through computation by a 3D engine, and 3D pictures applied to a movie are realized by using an off-line 3D engine, so as to achieve a realistic effect. The 3D engine includes, but not limited to, at least one of the following functions: data management, a renderer, and interaction. For example, a game that is offered as a real-time game may use a rasterized rendering algorithm, and for such a design, parameters related to geometry-level data include, but not limited to, refractive index, change rate in texture coordinate space, and change rate in tangent space. The foregoing example is merely exemplary, which is not limited in this application.

Figure 9:
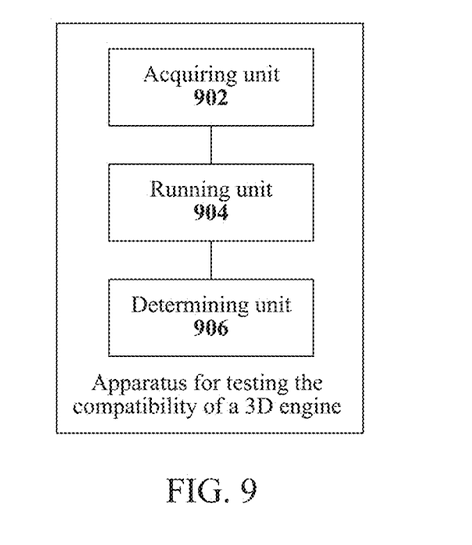
FIG. 9 is a schematic diagram of an optional apparatus for testing the compatibility of a 3D engine according to an embodiment of the present invention.

As shown in FIG. 9, the apparatus for testing the compatibility of a 3D engine in this embodiment includes: an acquiring unit 902, a running unit 904, and a determining unit 906.

1) The acquiring unit 902 is configured to acquire a hardware capability parameter of a graphics card to be simulated, the hardware capability parameter recording a capability supported by the graphics card.

Optionally, in this embodiment, the hardware capability parameter records the capability supported by the graphics card, where the capability supported by the graphics card may include, but not limited to, a cube texture (D3DTEXTURECAPS_CUBEMAP) capability, and a projected density profile (D3DTEXTURECAPS_PROJECTED) capability.

Optionally, in this embodiment, the hardware capability parameter of the graphics card to be simulated may be, but not limited to, stored in the form of a Caps database. The Caps database of graphics cards includes, but not limited to, models of the graphics cards, attributes of the graphics cards, values of the attributes of the graphics cards, and whether the graphics cards support a certain capability, where attributes of a graphics card in this embodiment includes, but not limited to, at least one of the following: a core frequency, a texture fill rate, a pixel fill rate, a shader, a video memory frequency, and a video memory width.

For example, using a graphics card A to be simulated as an example, as shown in FIG. 7, attributes of a graphics card whose model is ATI Radeon HD 3800 Series in the Caps database of graphics cards, and values of these attributes include: a maximum texture width (MaxTextureWidth) being 8192, and a maximum texture height (MaxTextureHeight) being 8192. In addition, it can be further known from the Caps database of graphics cards that the graphics card of this model can support the cube texture (D3DTEXTURECAPS_CUBEMAP) capability, and can also support the projected density profile (D3DTEXTURECAPS_PROJECTED) capability, but the graphics card of this model does not support an α palette (D3DTEXTURECAPS_ALPHAPALETTE) capability.

For example, with reference to step S302 to step S308 shown in FIG. 3, using the graphics card A to be simulated as an example, hardware capability parameters of the graphics card A to be simulated, for example, a core frequency of f, a video memory width of B, supporting a capability X, and not supporting a capability Y, are acquired, and then testing is performed.

2) The running unit 904 is configured to run a predetermined 3D engine according to the hardware capability parameter.

Optionally, in this embodiment, the 3D engine implements the required capability by invoking an API. For example, when the predetermined 3D engine is run, the 3D engine invokes APIs: API_1, API_2, and API_3, to implement a capability M, a capability N, and a capability P corresponding to the APIs.

3) The determining unit 906 is configured to determine, according to a result of running the 3D engine, whether the 3D engine is compatible with the graphics card to be simulated.

Optionally, in this embodiment, after it is determined whether the 3D engine is compatible with the graphics card to be simulated, the root cause of a compatibility issue may be further located, for example, information for indicating incompatibility may include, but not limited to, an API and a capability in the Caps database. For example, with reference to step S310 to step S316 shown in FIG. 3, after a test result indicating incompatibility is determined, information for indicating incompatibility is output: incompatible with API_2, and/or, incompatible with the capability N in the Caps database; and then, the information for indicating incompatibility is fed back, making it convenient for a developer to quickly fix the problem.

For example, using the graphics card A to be simulated as an example, the capability parameter corresponding to the capability that needs to be implemented by the API invoked by the 3D engine is learned according to the test result of running the 3D engine, and the capability parameter is compared with the hardware capability parameter of the graphics card A to be simulated, to determine whether the 3D engine is compatible with the graphics card A to be simulated.

In this embodiment provided by this application, different virtual graphics card data is simulated, and the data is used to test the compatibility of a 3D engine, to determine whether the 3D engine is compatible with a graphics card to be simulated, so that the problems of a long testing period and low efficiency caused by insertion and removal of a graphics card, driver reinstallation, and repeated building of a large number of hardware testing environments in the prior art are avoided, and different models of graphics cards are tested in the case of building a testing environment once, thereby shortening the testing period, and accelerating a testing procedure.

As an optional solution, the running unit 904 includes:

1) a first determining module, configured to determine whether a capability implemented by an API that is invoked when the 3D engine is run is the capability that is supported by the graphics card and recorded by the hardware capability parameter.

For example, using the graphics card A to be simulated as an example, the 3D engine invokes APIs: API_1, API_2, and API_3, to implement the capability M, the capability N, and the capability P, to determine whether the capability that needs to be implemented by the 3D engine is the capability supported by the graphics card and recorded by the hardware capability parameter.

Optionally, if the capability implemented by the API is the capability that is supported by the graphics card and recorded by the hardware capability parameter, it is determined that the result of running the 3D engine is normal.

For example, using the graphics card A to be simulated as an example, the 3D engine invokes APIs: API_1, API_2, and API_3, to implement the capability M (for example, the maximum texture width (MaxTextureWidth) is 8192), the capability N (the projected density profile (D3DTEXTURECAPS_PROJECTED) capability), and the capability P (for example, the cube texture (D3DTEXTURECAPS_CUBEMAP) capability). It can be known from the Caps database of graphics cards that the graphics card A to be simulated can support the foregoing capabilities, and it is determined that the result of running the 3D engine is normal.

Optionally, if the capability implemented by the API is not the capability that is supported by the graphics card and recorded by the hardware capability parameter, it is determined that the result of running the 3D engine is error.

For example, using the graphics card A to be simulated as an example, the 3D engine invokes APIs: API_1, API_2, and API_3, to implement the capability M (for example, the maximum texture width (MaxTextureWidth) is 8192) the capability N (the projected density profile (D3DTEXTURECAPS_PROJECTED) capability), and the capability P (for example, the α palette (D3DTEXTURECAPS_ALPHAPALETTE) capability). It can be known from the Caps database of graphics cards that the graphics card A to be simulated can support the capability M and the capability N, but does not support the capability P, and it is determined that the result of running the 3D engine is error.

In this embodiment provided by this application, it is determined whether a capability implemented by an API invoked by a 3D engine is a capability supported by a graphics card to be simulated, to obtain whether a result of running the 3D engine is normal, thereby obtaining a result of testing the compatibility of the 3D engine, so that a tester can obtain, by only simulating different models of graphics cards in a physical configuration environment and comparing capabilities, the result of testing the compatibility of the 3D engine, thereby saving a lot of time in building an environment, and shortening a testing period.

As an optional solution, the determining unit 906 includes:

1) a second determining module, configured to determine whether the result of running the 3D engine is normal; and determine, if the result of running the 3D engine is normal, that the 3D engine is compatible with the graphics card to be simulated; or determine, if the result of running the 3D engine is error, that the 3D engine is incompatible with the graphics card to be simulated.

For example, using the graphics card A to be simulated as an example, if it can be known from the Caps database of graphics cards that, the graphics card A to be simulated can support the corresponding capability M, capability N, and capability P when the 3D engine invokes the APIs, it is determined that the result of running the 3D engine is normal, and further, a test result indicating that the 3D engine is compatible with the graphics card A to be simulated may be obtained; however, if it is determined that the result of running the 3D engine is error, a test result indicating that the 3D engine is incompatible with the graphics card A to be simulated is obtained.

As an optional solution, the first determining module includes: a returning submodule and a first determining submodule.

1) The returning submodule is configured to return, by using a preset API, when the 3D engine is run, if it is determined that the API needs to be invoked currently, the capability implemented by the invoked API.

Optionally, in this embodiment, in an algorithm corresponding to the 3D engine, a function corresponding to the foregoing API for returning the implemented capability may be preset before or in the function corresponding to the foregoing preset API that needs to be invoked, so that before the function corresponding to the foregoing API that needs to be invoked is invoked, the foregoing preset function corresponding to the API is invoked first to return the capability implemented by the invoked API. For example, using the graphics card A to be simulated as an example, the 3D engine currently needs to invoke APIs: API_1, API_2, and API_3, to implement the capability M (for example, the maximum texture width (MaxTextureWidth) is 8192), the capability N (the projected density profile (D3DTEXTURECAPS_PROJECTED) capability), and the capability P (for example, the α palette (D3DTEXTURECAPS_ALPHAPALETTE) capability), and information about the capability M, the capability N, and the capability P implemented by the APIs currently invoked by the 3D engine may be returned by the using the preset API.

It is further noted that, under the premise of making no modification to the tested 3D engine, the API invoked when the 3D engine is run is remolded by using the preset API, the capability implemented by the API invoked by the 3D engine is learned, and the foregoing capability is returned.

2) The first determining submodule is configured to determine whether the returned capability is the capability that is supported by the graphics card and recorded by the hardware capability parameter.

For example, using the graphics card A to be simulated as an example, capabilities that correspond to the APIs currently invoked by the 3D engine and are returned by using the preset API are the capability M (for example, the maximum texture width (MaxTextureWidth) is 8192), the capability N (the projected density profile (D3DTEXTURECAPS_PROJECTED) capability), and the capability P (for example, the α palette (D3DTEXTURECAPS_ALPHAPALETTE) capability), and it is determined whether the foregoing capabilities are capabilities supported by the graphics card A to be simulated recorded by the hardware capability parameter.

In this embodiment provided by this application, from the perspective of a third party, a capability implemented by an API that currently needs to be invoked when a 3D engine is run is learned by using a preset API, and is further compared with a capability that is supported by a graphics card and recorded by a hardware capability parameter, and whether the 3D engine is compatible with the graphics card to be simulated is obtained, thereby acquiring invoking information completely from the third party when the 3D engine is run, and automatically testing the compatibility of the graphics card with the 3D engine.

Figure 10:
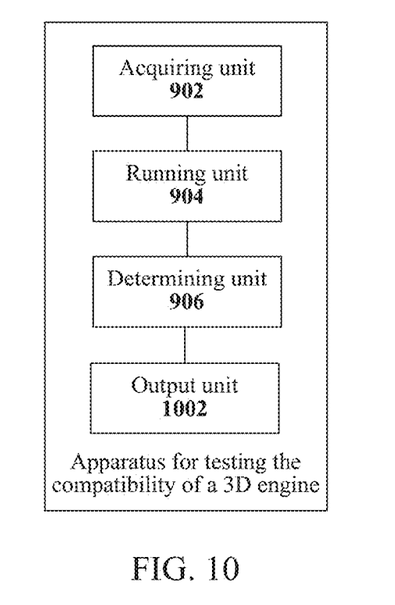
FIG. 10 is a schematic diagram of another optional apparatus for testing the compatibility of a 3D engine according to an embodiment of the present invention.

As an optional solution, as shown in FIG. 10, the apparatus for testing the compatibility of a 3D engine in this embodiment further includes:

1) an output unit 1002, configured to: after it is determined, according to the result of running the 3D engine, whether the 3D engine is compatible with the graphics card to be simulated, output information for identifying the API and information about the capability if the result of running the 3D engine is error.

Optionally, in this embodiment, after it is determined whether the 3D engine is compatible with the graphics card to be simulated, the root cause of a compatibility issue may be further located and output, for example, information for indicating incompatibility may include, but not limited to, an API and a capability in the Caps database.

Optionally, as shown in FIG. 6, Bench3D is a tool for testing the capability and the compatibility of the 3D engine in this embodiment, where a test result output by the Bench3D includes: a DXDebug view, and information about an identified API and information about a capability in the Caps database when the result of running the 3D engine is error can be known from the view. For example, the foregoing information may include: a sequence number (for example, 23850), a time (for example, 20:11:45:577), and Debuginfo (for example, Direct3D9: Texture in a virtual device D3DFMT_R16F format does not support D3DUSAGE_QUERY_POSTPIXELSHADER_BLENDING), and the foregoing example is merely exemplary, which is not limited in this application.

For example, using the graphics card A to be simulated as an example, if it can be known from the Caps database of graphics cards that the graphics card A to be simulated does not support the corresponding capability M when the 3D engine invokes the API, it is determined that the result of running the 3D engine is error, and further the information about the identified API and the information about the capability in the Caps database are output. For example, the output information may include the following information: a sequence number is 23850, a time is 20:11:45:577, and Debuginfo is Direct3D9: Texture in a virtual device D3DFMT_R16F format does not support D3DUSAGE_QUERY_POSTPIXELSHADER_BLENDING.

In this embodiment provided by this application, when a result of running a 3D engine is error, information for identifying an API and information about a capability are output, thereby solving the problem in the prior art that a test result only feeds back the description for a phenomenon, accurately locating the root cause of a compatibility issue, and making it convenient for a developer to quickly fix the problem.

Figure 11:
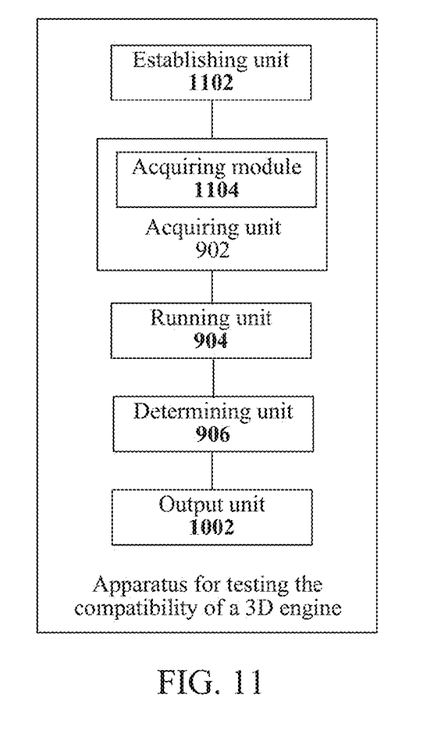
FIG. 11 is a schematic diagram of still another optional apparatus for testing the compatibility of a 3D engine according to an embodiment of the present invention.

As an optional solution, as shown in FIG. 11, the apparatus for testing the compatibility of a 3D engine in this embodiment further includes:

1) an establishing unit 1102, configured to establish a graphics card information database before the hardware capability parameter of the graphics card to be simulated is acquired, where the graphics card information database records models and hardware capability parameters of multiple graphics cards including the graphics card to be simulated.

Optionally, in this embodiment, the graphics card information database records models and hardware capability parameters of multiple graphics cards including the graphics card to be simulated.

For example, before the hardware capability parameter of the graphics card to be simulated is acquired, a large amount of graphics card information is collected, and a relatively complete graphics card information database (the Caps database of graphics cards) is established. As shown in FIG. 7, different models of graphics cards are included, for example, ATI Radeon HD 3800 Series, NVDIA GEForce 9500 GT, and RADEON X700 SE; different graphics card attributes and values corresponding to the attributes are included, for example, a graphics card A to be simulated whose model is ATI Radeon HD 3800 Series is used as an example, and the graphics card A to be simulated includes the following information: a value of a maximum texture width (MaxTextureWidth) is 8192, and a value of a maximum texture height (MaxTextureHeight) is 8192; and in addition, whether the graphics card of this model supports some capabilities is further included, for example, the graphics card A to be simulated whose model is ATI Radeon HD 3800 Series is still used as an example, and the graphics card A to be simulated can support the cube texture (D3DTEXTURECAPS_CUBEMAP) capability, and can also support the projected density profile (D3DTEXTURECAPS_PROJECTED) capability, but the graphics card of this model does not support the α palette (D3DTEXTURECAPS_ALPHAPALETTE) capability.

2) The acquiring unit 902 includes: an acquiring module 1104, configured to acquire the hardware capability parameter of the graphics card to be simulated from the graphics card information database.

Optionally, in this embodiment, the hardware capability parameter records the capability supported by the graphics card, where the capability supported by the graphics card may include, but not limited to, the cube texture (D3DTEXTURECAPS_CUBEMAP) capability, and the projected density profile (D3DTEXTURECAPS_PROJECTED) capability.

For example, using the graphics card A to be simulated as an example, a hardware capability parameter of the graphics card A to be simulated is acquired from the graphics card information database (the Caps database of graphics cards), for example, the maximum texture width (MaxTextureWidth) is 8192, and the maximum texture height (MaxTextureHeight) is 8192. In addition, it can be further known from the Caps database of graphics cards that, the graphics card can support the cube texture (D3DTEXTURECAPS_CUBEMAP) capability, and can also support the projected density profile (D3DTEXTURECAPS_PROJECTED) capability, but the graphics card does not support the α palette (D3DTEXTURECAPS_ALPHAPALETTE) capability.

In this embodiment provided by this application, a graphics card information database is established, and a hardware capability parameter of a graphics card to be simulated is acquired from the established graphics card information database, to implement simulation of a virtual graphics card, and further complete testing of a 3D engine without repeatedly building a large number of hardware testing environments, thereby saving a lot of testing costs, and shortening a testing period.

The sequence numbers of the foregoing embodiments of the present invention are merely for description, and do not represent the superiority or inferiority of the embodiments.

In the foregoing embodiments of the present invention, the description of each of the embodiments has respective focuses. For a part that is not described in detail in a certain embodiment, reference may be made to related descriptions in other embodiments.

In the several embodiments provided by this application, it should be understood that the disclosed client may be implemented in other manners. The described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and the parts displayed as units may or may not be physical units, may be located in one position, or may be distributed on multiple network units. Some or all of the units may be selected to achieve the objectives of the solutions of the embodiments according to actual needs.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing a computer device (which may be a PC, a server, a network device, or the like) to perform all or some of the steps of the methods described in the embodiments of the present invention. The foregoing storage medium includes: any medium that can store program code, such as a USB flash drive, a removable hard disk, a ROM, a RAM, a magnetic disk, or an optical disc.

The foregoing descriptions are merely preferred implementation manners of the present disclosure. It should be noted that, a person of ordinary skill in the art may further make various improvements and refinements without departing from the principle of the present disclosure. All such improvements and refinements shall fall within the protection scope of the present disclosure.

What is claimed is:

1. A method for testing the compatibility of a 3D engine, comprising:
    acquiring, by a computing terminal, a hardware capability parameter of a graphics card to be simulated, the hardware capability parameter recording a capability supported by the graphics card;
    running, by the computing terminal, a 3D engine according to the hardware capability parameter; and
    determining, by the computing terminal according to a result of running the 3D engine, whether the 3D engine is compatible with the graphics card to be simulated, wherein a hardware and software environment of the computing terminal is built once and remains unchanged in testing the compatibility of the 3D engine with different graphics cards to be simulated,
    wherein the running the 3D engine according to the hardware capability parameter comprises:
    remodeling an implementation application programming interface (API) needs to be invoked when the 3D engine is run by using a preset API under a premise of making no modification to the 3D engine, including:
        setting a first function corresponding to the preset API before or in a second function corresponding to the implementation API that needs to be invoked when the 3D engine is run, such that the first function corresponding to the preset API is invoked before the second function corresponding to the implementation API is invoked;
    determining whether a capability implemented by the implementation API that is invoked when the 3D engine is run is the capability that is supported by the graphics card and recorded by the hardware capability parameter through using the preset API;
    determining, if the capability implemented by the implementation API is the capability that is supported by the graphics card and recorded by the hardware capability parameter, that the result of running the 3D engine is normal; or determining, if the capability implemented by the implementation API is not the capability that is supported by the graphics card and recorded by the hardware capability parameter, that the result of running the 3D engine is error; and
    providing a shortened period of testing the compatibility of the 3D engine with a plurality of graphics cards by: instead of building the hardware and software environment of the computing terminal repeatedly for testing the compatibility of the 3D engine with the plurality of graphics cards, running the 3D engine and using the preset API a plurality of times when the implementation API needs to be invoked according to hardware capability parameters of the plurality of graphics cards on the same computing terminal without changing the hardware and software environment of the computing terminal.

2. The method according to claim 1, wherein the determining, according to a result of running the 3D engine, whether the 3D engine is compatible with the graphics card to be simulated comprises:
    determining, if the result of running the 3D engine is normal, that the 3D engine is compatible with the graphics card to be simulated; or
    determining, if the result of running the 3D engine is error, that the 3D engine is incompatible with the graphics card to be simulated.

3. The method according to claim 1, wherein the determining whether a capability implemented by the implementation API that is invoked when the 3D engine is run is the capability that is supported by the graphics card and recorded by the hardware capability parameter comprises:
    returning, by using the preset API, when the 3D engine is run, if it is determined that the implementation API needs to be invoked currently, the capability implemented by the invoked implementation API; and
    determining whether the returned capability is the capability that is supported by the graphics card and recorded by the hardware capability parameter.

4. The method according to claim 1, after the determining, according to a result of running the 3D engine, whether the 3D engine is compatible with the graphics card to be simulated, further comprising:
    outputting debug information for identifying the implementation API and identifying information about the capability in a graphical user interface if the result of running the 3D engine is error, such that the debug information locates a root cause of a compatibility issue and allows a developer to fix the compatibility issue conveniently.

5. The method according to claim 1, wherein
    before the acquiring a hardware capability parameter of a graphics card to be simulated, the method further comprises: establishing a graphics card information database, wherein the graphics card information database records models and hardware capability parameters of multiple graphics cards comprising the graphics card to be simulated, wherein
    the acquiring a hardware capability parameter of a graphics card to be simulated comprises: acquiring the hardware capability parameter of the graphics card to be simulated from the graphics card information database.

6. An apparatus for testing the compatibility of a 3D engine, comprising:
    a processor; and
    a memory storing a plurality of program units to be executed by the processor, the plurality of program units comprising:
    an acquiring unit, configured to acquire a hardware capability parameter of a graphics card to be simulated, the hardware capability parameter recording a capability supported by the graphics card;
    a running unit, configured to run a predetermined 3D engine according to the hardware capability parameter; and
    a determining unit, configured to determine, according to a result of running the 3D engine, whether the 3D engine is compatible with the graphics card to be simulated, wherein a hardware and software environment of the computing terminal is built once and remains unchanged in testing the compatibility of the 3D engine with different graphics cards to be simulated,
wherein the running unit comprises a first determining module, configured to:
remodel an implementation application programming interface (API) needs to be invoked when the 3D engine is run by using a preset API under a premise of making no modification to the 3D engine, including: setting a first function corresponding to the preset API before or in a second function corresponding to the implementation API that needs to be invoked when the 3D engine is run, such that the first function corresponding to the preset API is invoked before the second function corresponding to the implementation API is invoked;
determine whether a capability implemented by a the implementation API that is invoked when the 3D engine is run is the capability that is supported by the graphics card and recorded by the hardware capability parameter through using the preset API;
determine, if the capability implemented by the implementation API is the capability that is supported by the graphics card and recorded by the hardware capability parameter, that the result of running the 3D engine is normal; or determine, if the capability implemented by the implementation API is not the capability that is supported by the graphics card and recorded by the hardware capability parameter, that the result of running the 3D engine is error; and
provide a shortened period of testing the compatibility of the 3D engine with a plurality of graphics cards by: instead of building the hardware and software environment of the computing terminal repeatedly for testing the compatibility of the 3D engine with the plurality of graphics cards, running the 3D engine and using the preset API a plurality of times when the implementation API needs to be invoked according to hardware capability parameters of the plurality of graphics cards on the same computing terminal without changing the hardware and software environment of the computing terminal.

7. The apparatus according to claim 6, wherein the determining unit comprises:
a second determining module, configured to determine whether the result of running the 3D engine is normal; and determine, if the result of running the 3D engine is normal, that the 3D engine is compatible with the graphics card to be simulated; or determine, if the result of running the 3D engine is error, that the 3D engine is incompatible with the graphics card to be simulated.

8. The apparatus according to claim 6, wherein the first determining module comprises:
a returning submodule, configured to return, by using the preset API, when the 3D engine is run, if it is determined that the implementation API needs to be invoked currently, the capability implemented by the invoked implementation API; and
a first determining submodule, configured to determine whether the returned capability is the capability that is supported by the graphics card and recorded by the hardware capability parameter.

9. The apparatus according to claim 6, further comprising:
an output unit, configured to: after it is determined, according to the result of running the 3D engine, whether the 3D engine is compatible with the graphics card to be simulated, output debug information for identifying the implementation API and identifying information about the capability in a graphical user interface if the result of running the 3D engine is error, such that the debug information locates a root cause of a compatibility issue and allows a developer to fix the compatibility issue conveniently.

10. The apparatus according to claim 6, wherein
the apparatus further comprises: an establishing unit, configured to establish a graphics card information database before the hardware capability parameter of the graphics card to be simulated is acquired, wherein the graphics card information database records models and hardware capability parameters of multiple graphics cards comprising the graphics card to be simulated, wherein
the acquiring unit comprises: an acquiring module, configured to acquire the hardware capability parameter of the graphics card to be simulated from the graphics card information database.

11. A non-transitory computer-readable storage medium storing computer program instructions executable by at least one processor to perform:
acquiring a hardware capability parameter of a graphics card to be simulated, the hardware capability parameter recording a capability supported by the graphics card;
running a 3D engine according to the hardware capability parameter; and
determining, according to a result of running the 3D engine, whether the 3D engine is compatible with the graphics card to be simulated, wherein a hardware and software environment of the computing terminal is built once and remains unchanged in testing the compatibility of the 3D engine with different graphics cards to be simulated,
wherein the running the 3D engine according to the hardware capability parameter comprises:
remodeling an implementation application programming interface (API) needs to be invoked when the 3D engine is run by using a preset API under a premise of making no modification to the 3D engine, including: setting a first function corresponding to the preset API before or in a second function corresponding to the implementation API that needs to be invoked when the 3D engine is run, such that the first function corresponding to the preset API is invoked before the second function corresponding to the implementation API is invoked;
determining whether a capability implemented by the implementation API that is invoked when the 3D engine is run is the capability that is supported by the graphics card and recorded by the hardware capability parameter through using the preset API;
determining, if the capability implemented by the implementation API is the capability that is supported by the graphics card and recorded by the hardware capability parameter, that the result of running the 3D engine is normal; or determining, if the capability implemented by the implementation API is not the capability that is supported by the graphics card and recorded by the hardware capability parameter, that the result of running the 3D engine is error; and
providing a shortened period of testing the compatibility of the 3D engine with a plurality of graphics cards by: instead of building the hardware and software environment of the computing terminal repeatedly for testing the compatibility of the 3D engine with the plurality of graphics cards, running the 3D engine and using the preset API a plurality of times when the implementation API needs to be invoked according to hardware capability parameters of the plurality of graphics cards on the same computing terminal without changing the hardware and software environment of the computing terminal.

12. The storage medium according to claim 11, wherein the determining, according to a result of running the 3D engine, whether the 3D engine is compatible with the graphics card to be simulated comprises:
    determining, if the result of running the 3D engine is normal, that the 3D engine is compatible with the graphics card to be simulated; or
    determining, if the result of running the 3D engine is error, that the 3D engine is incompatible with the graphics card to be simulated.

13. The storage medium according to claim 11, wherein the determining whether a capability implemented by the implementation API that is invoked when the 3D engine is run is the capability that is supported by the graphics card and recorded by the hardware capability parameter comprises:
    returning, by using the preset API, when the 3D engine is run, if it is determined that the implementation API needs to be invoked currently, the capability implemented by the invoked implementation API; and
    determining whether the returned capability is the capability that is supported by the graphics card and recorded by the hardware capability parameter.

14. The storage medium according to claim 11, wherein, after the determining, according to a result of running the 3D engine, whether the 3D engine is compatible with the graphics card to be simulated, the stored program instructions further causes the at least one processor to perform:
    outputting debug information for identifying the implementation API and identifying information about the capability in a graphical user interface if the result of running the 3D engine is error, such that the debug information locates a root cause of a compatibility issue and allows a developer to fix the compatibility issue conveniently.

15. The storage medium according to claim 11, wherein before the acquiring a hardware capability parameter of a graphics card to be simulated, the stored program instructions further causes the at least one processor to perform: establishing a graphics card information database, wherein the graphics card information database records models and hardware capability parameters of multiple graphics cards comprising the graphics card to be simulated, wherein
    the acquiring a hardware capability parameter of a graphics card to be simulated comprises: acquiring the hardware capability parameter of the graphics card to be simulated from the graphics card information database.

* * * * *